US007120899B1

United States Patent
Sievert

(12) 
(10) Patent No.: US 7,120,899 B1
(45) Date of Patent: Oct. 10, 2006

(54) METHOD FOR IMPLEMENTING COMPONENT OBJECT MODEL INTERFACES

(75) Inventor: James A. Sievert, Lino Lakes, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/422,018

(22) Filed: Oct. 21, 1999

(51) Int. Cl.
G06F 9/44 (2006.01)
(52) U.S. Cl. ...................... 717/116; 717/165
(58) Field of Classification Search ............... 717/107, 717/120–122, 162–167, 116; 709/310–317, 709/328–332; 703/4
See application file for complete search history.

(56) References Cited

U.S. PATENT DOCUMENTS

| | | | | |
|---|---|---|---|---|
| 5,724,588 A | * | 3/1998 | Hill et al. | 709/328 |
| 5,815,415 A | * | 9/1998 | Bentley et al. | 703/4 |
| 6,063,128 A | * | 5/2000 | Bentley et al. | 703/6 |
| 6,182,107 B1 | * | 1/2001 | Atsatt | 709/100 |
| 6,209,040 B1 | * | 3/2001 | Acton et al. | 709/315 |
| 6,256,778 B1 | * | 7/2001 | Oliver | 717/106 |
| 6,405,368 B1 | * | 6/2002 | Freyburger | 717/140 |
| 6,412,019 B1 | * | 6/2002 | Gibbons et al. | 709/315 |

OTHER PUBLICATIONS

Shepherd et al., "The Visual Programmer", Microsoft Systems Journal, Oct. 1997, pp. 1-11 (printed 4 to a sheet).*
ImplementQI.H, webpage: "http://homepage.interaccess.com/~hollp/docs/ImplementQI.htm"; Jul. 14, 2000.*
Hailpern et al., "Extending Objects to Support Multiple Interfaces and Access Control", IEEE Transactions on Software Engineering, vol. 16, No. 11, Nov. 1990; pp. 1247-1257.*
Hamilton et al.; "Using Interface Inheritance to Address Problems in System Software Evolution"; Sun Microsystems Laboratories, Inc.; Nov. 1993.*

* cited by examiner

Primary Examiner—Kakali Chaki
Assistant Examiner—William H. Wood
(74) Attorney, Agent, or Firm—Charles A. Johnson; Mark T. Starr; Crawford Maunu PLLC

(57) ABSTRACT

A method for implementing a hierarchy of component object model interfaces. A hierarchy of component object model interfaces is defined in which an interface at a lowest level of the hierarchy inherits from an interface at the highest level of the hierarchy. A class is defined that includes a first template class that is associated with the highest level of the hierarchy. A second template class inherits from the first template class and is associated with the lowest level of the hierarchy. The second template class is instantiated with an interface as a template parameter. Thus, the instantiation of an object of the most specialized class provides the base interface from which the most generalized class derives.

17 Claims, 2 Drawing Sheets

METHOD FOR IMPLEMENTING COMPONENT OBJECT MODEL INTERFACES

FIELD OF THE INVENTION

The present invention generally relates to the Component Object Model (COM) and more particularly, to implementing a hierarchy of COM interfaces.

BACKGROUND OF THE INVENTION

The Component Object Model (COM) is a software architecture that supports reuse of software components between different application programs written in different languages. Reusing software components, where appropriate, reduces the cost of creating a new application as compared to creating an application from scratch. COM addresses the issues of interoperability where reuse is desirable for binary executables that are created by different entities in different languages.

In COM, a "component" is a piece of compiled code that provides one or more services. It will be appreciated that even though a component is also an object in object oriented programming (OOP) terms, the term "component" will be used herein to avoid confusion with other objects in general. An "interface" is the mechanism through which components interact and through which software in general accesses the services of a component. The interface defines the behavior and responsibilities of the component. In other words, the interface is a group of related functions and forms the binary standard or contract through which the component is accessed.

A COM interface is not a class and cannot be instantiated by itself. A COM component must implement the interface, and the component must be instantiated for the interface to exist. It will be appreciated that the same interface can be implemented in different ways by different components with the restriction that each component must satisfy the interface's behavior and responsibilities. The information presented above, along with a more detailed explanation, is found in "Dr. Dobbs Journal", December 1994.

Sometimes it is desirable to implement a hierarchy of interfaces, which is often accompanied by a parallel class hierarchy, for example in C++. In implementing the component(s) behind the interfaces, ambiguity may result between certain method calls. Delegation is generally the method used to resolve ambiguity.

The problem is illustrated with the following example COM interface hierarchy:

```
interface IAnimal : IUnknown
{
    HRESULT eat( );
};
interface IPerson : IAnimal
{
    HRESULT talk( );
};
interface IEmployee : IPerson
{
    HRESULT work( );
};
```

The hierarchy includes three interfaces: IAnimal, IPerson, and IEmployee. Interface IAnimal is a type of the base interface, IUnknown, which is provided by COM; interface IPerson is a type of the IAnimal interface; and interface IEmployee is a type of IPerson interface. Interface IAnimal has a member method, eat( ); interface IPerson has a member method, talk( ); and interface IEmployee has a member method, work( ).

A parallel class hierarchy is often desirable when implementing such an interface hierarchy. Such a design allows the implementation of a given interface to be totally encapsulated by a single class. Initially consideration of implementing the above interface hierarchy in C++ leads to the following parallel class hierarchy:

```
typedef someType TStatus;
class CAnimal
{
    virtual TStatus eat( )
        { ... }
};
class CPerson : public CAnimal
{
    virtual TStatus talk( )
        { ... }
};
class CEmployee : public CPerson
{
    virtual TStatus work( )
        { ... }
};
```

The C++ access specifications (public, private, and protected) have been omitted to enhance readability. It can be seen that the classes CAnimal, CPerson, and CEmployee parallel the interfaces IAnimal, IPerson, and IEmployee in terms of inheritance and method definitions. The virtual methods eat( ), talk( ), and work( ) are included in the classes CAnimal, CPerson, and CEmployee, respectively.

To implement the interface hierarchy along with the COM components, a C++ implementation begins with incorporation of the COM interface. Thus, the IAnimal interface may be implemented as:

```
class CComAnimal
    : public IAnimal
{
    STDMETHOD( eat ) ( )
        { ... }
};
```

At this juncture, IAnimal defines an abstract method eat( ), which has a concrete implementation in CComAnimal. It will be appreciated that STDMETHOD is a commonly used C++ preprocessor macro within the Microsoft C++ environment. The STDMETHOD( ) macro defines the standard calling convention and return type for a COM interface method.

The following code shows analogous concrete implementations of the IPerson and IEmployee interfaces:

```
class CComPerson
    : public IPerson, public CComAnimal
{
    STDMETHOD( talk ) ( )
        { ... }
};
```

-continued

```
class CComEmployee
    : public IEmployee, public CComPerson
{
    STDMETHOD( work ) ( )
        { ... }
};
```

It will be appreciated that if the foregoing code is left as is, the multiple inheritance introduced from both IPerson and CComAnimal makes referencing the method CComPerson::eat( )ambiguous. That is, CComPerson::eat( ) may be in reference to eat( ) of interface IAnimal (by virtue of inheritance from IPerson) or in reference to eat( ) of class CComAnimal. A similar ambiguity exists between eat( ) and talk( ) as defined in CComPerson and eat( ) and talk( ) as declared in IEmployee. Thus, using delegation, the ambiguity is resolved with the following example code:

```
class CComPerson
        : public IPerson, public CComAnimal
{
    STDMETHOD( eat ) ( )
        { return CComAnimal::eat( ); }
    STDMETHOD( talk ) ( )
        { ... }
};
class CComEmployee
        : public IEmployee, public CComPerson
{
    STDMETHOD( eat ) ( )
        { return CComPerson::eat( ); }
    STDMETHOD( talk ) ( )
        { return CComPerson::talk( ); }
    STDMETHOD ( work ) ( )
        { ... }
};
```

At this point, a C++ class implementation hierarchy has been defined that parallels the COM interface hierarchy. If the interfaces IAnimal, IPerson, and IEmployee had additional methods, then additional delegation code would be required. Furthermore, if the interface hierarchy had been deeper, more delegation code would be needed. While the delegation code provides a functioning implementation, understanding the implementation from a developer's point of view may be difficult because of the complex inheritance relationships and the representation in an object diagram.

FIG. 1 is an object model diagram that illustrates the class relationships of the class definitions set forth in the preceding code. It can be seen from the diagram that some of the classes inherit from two classes. For example, the CComEmployee class inherits from the CComPerson class and IEmployee interface. In addition, the IEmployee interface inherits from the CComAnimal class and the IPerson interface.

A method that addresses the aforementioned problems, as well as other related problems, is therefore desirable.

SUMMARY OF THE INVENTION

In various embodiments, the invention provides a method for implementing a hierarchy of component object model interfaces. A hierarchy of component object model interfaces is defined in which an interface at a lowest level of the hierarchy inherits from an interface at the highest level of the hierarchy. A class is defined that includes a first template class that is associated with the highest level of the hierarchy. A second template class inherits from the first template class and is associated with the lowest level of the hierarchy. The second template class is instantiated with an interface as a template parameter. Thus, the instantiation of an object of the most specialized class provides the base interface from which the most generalized class derives.

In accordance with another embodiment of the invention, there is provided a computer program product that is configured to be operable to implement a COM interface hierarchy without using delegation methods. In the computer program product, an object of the most specialized class provides the base interface as a template class parameter, from which the most generalized class derives.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

Figure 1:
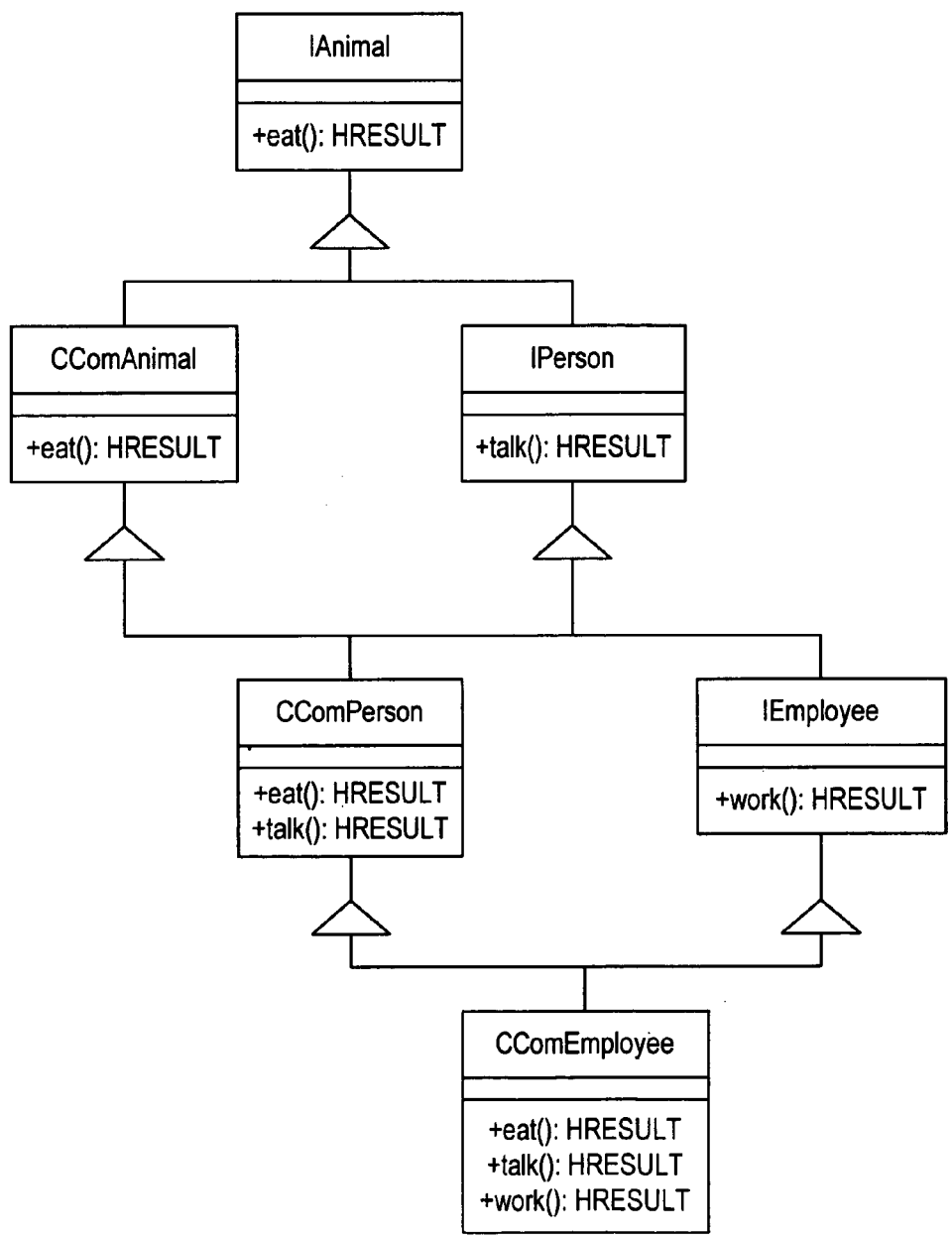
FIG. 1 is an object model diagram that illustrates the relationships of a Component Interface Hierarchy and the associated class definitions when using delegation methods.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION

The present invention is believed to be applicable to a variety of object-oriented applications. The invention has been found to be particularly applicable and beneficial for applications written in C++ for the Component Object Model. While the present invention is not so limited, an appreciation of the present invention is presented by way of an example COM interface hierarchy.

In accordance with the embodiments described herein, the delegation methods are eliminated using a single inheritance implementation. In implementing the example set forth in the Background section using single inheritance, CComAnimal inherits from the "most derived" or most specialized interface, IEmployee. Further derivations of CComPerson and CComEmployee are implemented so as to provide concrete implementations of the abstract methods declared in the more specialized interfaces.

An example for illustrating the embodiments of this invention begins with the following code:

```
class CComAnimal
        : public IEmployee
{
    STDMETHOD( at ) ( )
        { ... }
};
class CComPerson
        : public CComAnimal
{
    STDMETHOD( talk ) ( )
        { ... }
};
class CComEmployee
        : public CComPerson
{
    STDMETHOD( work ) ( )
        { ... }
};
```

This code eliminates the delegation methods described above because each method is unambiguously defined. The implementation has as a disadvantage the least specialized class, CComAnimal, inheriting from the interface of the most specialized class, CComEmployee. The problem created is that the developer of CComAnimal may not know a-priori the interface from which to inherit because the another developer may define the most specialized class at a later time. This lack of information limits future re-use possibilities for the CComAnimal class.

Consider further extension of the example such that an interface IEmployeeEx inherits from IPerson, and IEmployeeEx is implemented by CComEmployeeEx that inherits from CComPerson. With the addition of IEmployeeEx and CComEmployeeEx, there are no clear a-priori options for the developer of the CComAnimal class in terms of interface inheritance.

In one embodiment, C++ templates are used to implement the single inheritance method of the present invention. In the example code below, the templates provide a convenient means by which to choose the correct interface from which CComAnimal inherits in a single inheritance scheme. The following code illustrates a template-based single inheritance implementation.

```
template< typename BaseInterface >
class CComAnimal
        : public BaseInterface
{
    STDMETHOD( eat ) ( )
        { ... }
};
template< typename BaseInterface >
class CComPerson
        : public CComAnimal< BaseInterface >
{
    STDMETHOD( talk ) ( )
        { ... }
};
template< typename BaseInterface >
class CComEmployee
        : public CComPerson< BaseInterface >
{
    STDMETHOD( work ) ( )
        { ... }
};
```

From the preceding code it can be seen that the inheritance hierarchy provides a method by which the most derived class can establish the base interface for CComAnimal. That is, code instantiating the template CComEmployee would provide, as a template parameter, the base interface from which ultimately, CComAnimal would derive. The template capability of CComEmployee provides better extensibility in that a subsequent developer could derive from CComEmployee, specifying yet another interface base class.

The syntax given above is typical of C++ template declaration. Stated simply, BaseInterface is a parameter to be supplied at compile time that specifies some type (class, struct, and/or interface). The compiler substitutes the specified type wherever BaseInterface is declared. An example usage is CComEmployee<IEmployee> employee Here, the variable employee is of type CComEmployee<IEmployee>. Through template substitution of IEmployee for BaseInterface, CComEmployee<IEmployee> itself derives from CComPerson<IEmployee>. Because CComPerson is itself a template class, CComPerson<IEmployee> derives from CcomAnimal<IEmployee>. Finally, because CComAnimal is a template class, CComAnimal derives from IEmployee, which was the ultimate goal.

In another embodiment, the class CComEmployee could be declared as "class CComEmployee: public CComPerson<IEmployee>." This embodiment provides the lowest level interface, IEmployee, as a parameter to the CComPerson template directly in the class definition for CComEmployee. As with the previously described embodiment, this embodiment also eliminates the need for delegation methods. Since the interface is provided as the parameter to the CComPerson template in the class definition, the instantiation of a CComEmployee object does not require providing the IEmployee parameter as for the previously described embodiment.

It will be appreciated that this invention eliminates delegation through unambiguous method definition while allowing the most specialized class to specify the interface from which the base class will inherit.

Figure 2A:
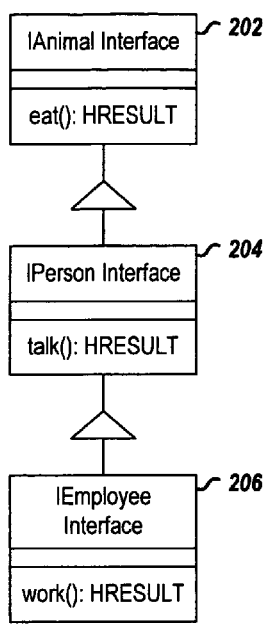
FIGS. 2A and 2B are object model diagrams that illustrate the interface and class hierarchies, respectively, in practicing one embodiment of the invention.
Figure 2B:
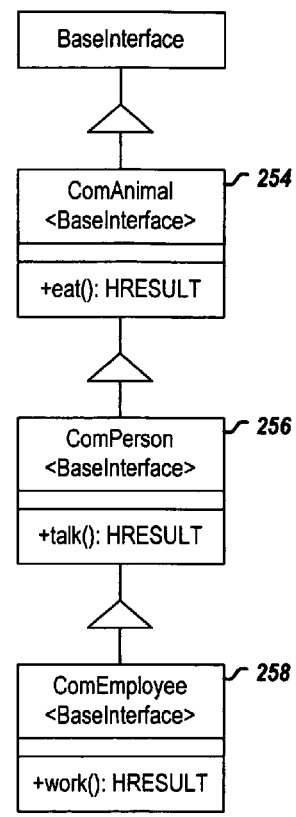

FIGS. 2A and 2B are object model diagrams that illustrate the interface hierarchy and the class hierarchy of the implementation example set forth above. The interface hierarchy of FIG. 2A shows the interfaces IAnimal, IPerson, and IEmployee as blocks 202, 204, and 206, respectively. Interface IEmployee is a kind of IPerson interface, and interface IPerson is a kind of IAnimal interface. The interfaces IAnimal, IPerson, and IEmployee include the public methods eat( ), talk( ), and work( ), respectively.

FIG. 2B shows the class hierarchy for implementing the COM interface in C++ classes that parallel the interface hierarchy. Block 252 represents the BaseInterface template, and block 254 shows that class ComAnimal is a kind of BaseInterface template and has the member method eat( ). Class ComPerson, as shown by block 256 includes the member method talk( ) and is a kind of ComAnimal.

Block 258 shows that class ComEmployee is a kind of ComPerson and has the member method work( ).

By convention, a modeled class is called "MyClass." When codified, MyClass becomes "CMyClass."

In another embodiment, the preceding implementation can be combined with the ActiveX Template Library (ATL). ATL is a constituent part of the Microsoft C++ development environment. ATL provides an infrastructure for the rapid development of COM objects in a Microsoft C++ development environment.

ATL allows each level of the inheritance hierarchy to establish and evaluate its own ATL interface map. The ATL interface map is a mechanism by which one can furnish the interfaces available from a COM object to the underlying ATL infrastructure. The importance of each level of the inheritance hierarchy establishing and maintaining its own interface map stems from notion of functionality encapsulation that classes provide.

The code below illustrates the ATL implementation.

```
template< typename BaseInterface >
class CComAnimal:
        public CComObjectRootEx
                < model-of-your-choice >,
        public BaseInterface
{
    BEGIN_COM_MAP( CComAnimal< BaseInterface > )
        COM_INTERFACE_ENTRY ( IAnimal )
    END_COM_MAP( )
    STDMETHOD( eat ) ( )
        { . . . }
};
template< typename BaseInterface >
class CComPerson :
        public CComAnimal< BaseInterface >
{
    BEGIN_COM_MAP( CComPerson< BaseInterface > )
        COM_INTERFACE_ENTRY( IPerson )
        COM_INTERFACE_ENTRY_CHAIN
            ( CComAnimal< BaseInterface > )
    END_COM_MAP( )
    STDMETHOD( talk ) ( )
        { . . . }
};
template< typename BaseInterface >
class CComEmployee :
        public CComPerson< BaseInterface >
{
    BEGIN_COM_MAP( CComEmployee )
        COM_INTERFACE_ENTRY( IEmployee )
        COM_INTERFACE_ENTRY_CHAIN
            ( CComPerson< BaseInterface > )
    END_COM_MAP( )
    STDMETHOD( work ) ( )
        { . . . }
};
```

In the ATL implementation, each level of the inheritance hierarchy is responsible for implementing its own interface. The ATL implementation differs from the implementation associated with FIGS. 2A and 2B in how interface support is made available to the ATL infrastructure.

As a result, the appropriate interface is added to the interface map at each level of the hierarchy. Furthermore, specialized levels of the hierarchy use COM_INTERFACE_ENTRY_CHAIN( ) to delegate to implementations in less specialized classes.

It will be appreciated that the ATL implementation provides independent levels of interface selection. That is, each level of the inheritance hierarchy exposes only those interfaces directly implemented at the particular inheritance hierarchy level. Such a design provides strong encapsulation of interface exposure.

The embodiments described herein provide a method that eliminates the need for delegation methods when implementing COM interface hierarchies with a parallel C++ class hierarchy. The implementation method saves time when coding COM objects in C++ that implement a COM interface hierarchy and can be easily coupled with ATL to provide independent levels of interface selection.

Accordingly, the present invention provides, among other aspects, a method for implementing COM interface hierarchies. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

I claim:

1. A computer-implemented method for implementing a hierarchy of component object model interfaces, comprising:
   defining a hierarchy of component object model interfaces, wherein an interface at a lowest level of the hierarchy inherits from an interface at the highest level of the hierarchy;
   defining a first template class that is associated with the highest level of the hierarchy;
   defining a second template class that inherits from the first template class and is associated with the lowest level of the hierarchy; and
   instantiating the second template class with an interface as a template parameter.

2. The method of claim 1, wherein the second template class inherits directly from the first template class.

3. The method of claim 1, wherein the second template class inherits indirectly from the first template class.

4. The method of claim 1, further comprising defining a plurality of intermediate classes in a single inheritance arrangement, one of the intermediate classes inheriting from the first template class, and the second template class inheriting from another one of the intermediate classes.

5. The method of claim 4, wherein one or more of the intermediate classes are template classes.

6. The method of claim 1, further comprising defining an intermediate class, the intermediate class inheriting from the first template class, and the second template class inheriting from the intermediate class.

7. The method of claim 6, wherein the intermediate class is a template class.

8. The method of claim 1, wherein the interface provided as the template parameter is an interface at the lowest level of the hierarchy.

9. The method of claim 1, further comprising:
   extending the hierarchy of component object model interfaces to include a new interface defined at the lowest level of the hierarchy, wherein the new interface inherits from the interface at the highest level of the hierarchy;
   defining a third template class that inherits from the first template class and is associated with the new interface defined at the lowest level of the hierarchy; and
   instantiating the third template class with the new interface as a template parameter.

10. The method of claim 1, further comprising defining ActiveX Template Library interface maps in the first template class and in the second template class, respectively.

11. The method of claim 10, further comprising defining a plurality of intermediate classes in a single inheritance arrangement, one of the intermediate classes inheriting from the first template class, and the second template class inheriting from another one of the intermediate classes.

12. The method of claim 11, wherein one or more of the intermediate classes are template classes.

13. The method of claim 12, further comprising defining ActiveX Template Library interface maps in the respective intermediate template classes.

14. The method of claim 13, wherein the interface provided as the template parameter is an interface at the lowest level of the hierarchy.

15. The method of claim 14, further comprising:

extending the hierarchy of component object model interfaces to include a new interface defined at the lowest level of the hierarchy, wherein the new interface inherits from the interface at the highest level of the hierarchy;

defining a third template class that inherits from the first template class and is associated with the new interface defined at the lowest level of the hierarchy; and instantiating the third template class with the new interface as a template parameter.

16. A computer-implemented method for implementing a hierarchy of component object model interfaces, comprising:

defining a hierarchy of component object model interfaces, wherein an interface at a lowest level of the hierarchy inherits from an interface at the highest level of the hierarchy;

defining a first template class that is associated with the highest level of the hierarchy;

defining a second class that inherits from the first template class and is associated with the lowest level of the hierarchy; and providing an interface of the lowest level of the hierarchy as a template parameter to a template class directly inherited by the second class.

17. A computer-implemented method for implementing a hierarchy of component object model interfaces, comprising:

defining a hierarchy of component object model interfaces, wherein an interface at a lowest level of the hierarchy inherits from an interface at the highest level of the hierarchy;

defining a first template class that is associated with the highest level of the hierarchy;

defining a second template class that inherits from the first template class and is associated with the lowest level of the hierarchy; and instantiating the second template class with a selected one of the component object model interfaces as a template parameter.

* * * * *